E. PERRIN.
APPARATUS FOR MEASURING THE PITCH OF CYLINDRICAL AND CONICAL SCREWS HAVING THREADS OF ANY SECTION.
APPLICATION FILED APR. 2, 1917.
1,285,356.
Patented Nov. 19, 1918.
4 SHEETS—SHEET 1.
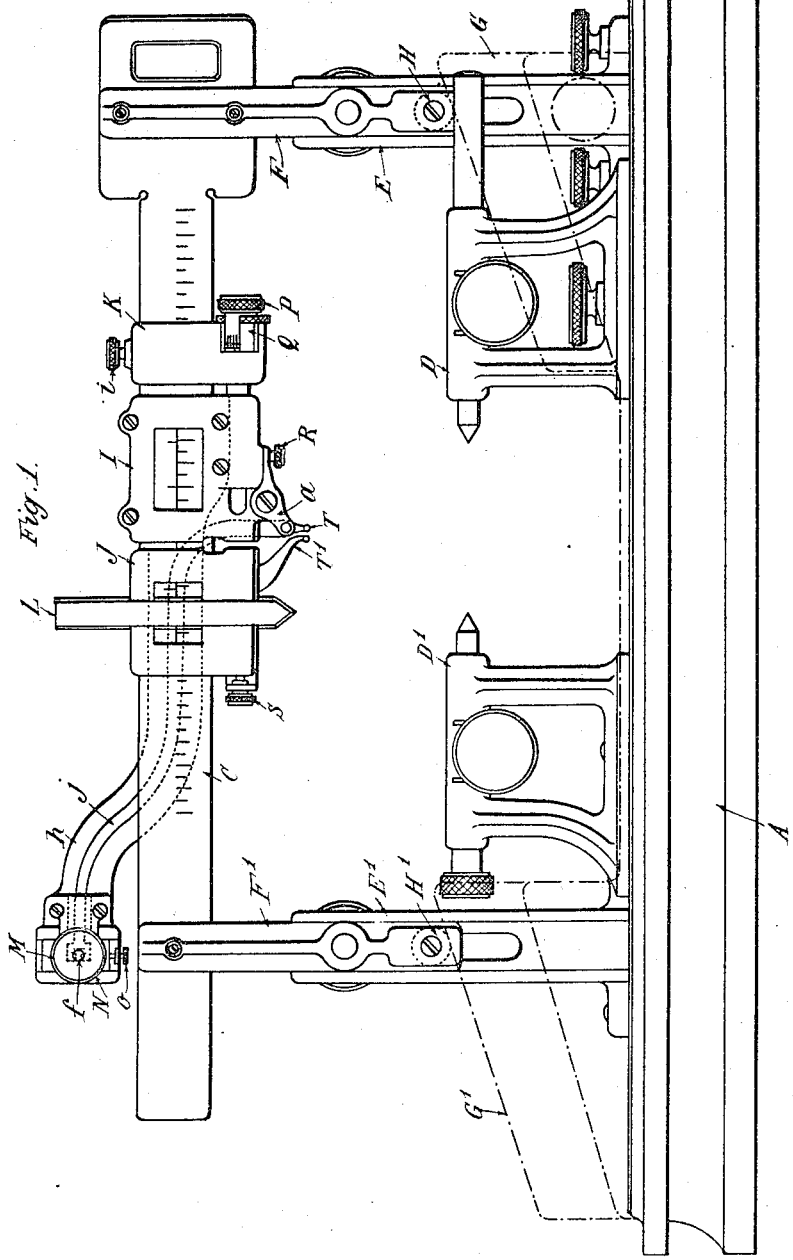
Inventor
Emile Perrin
By
Attorney

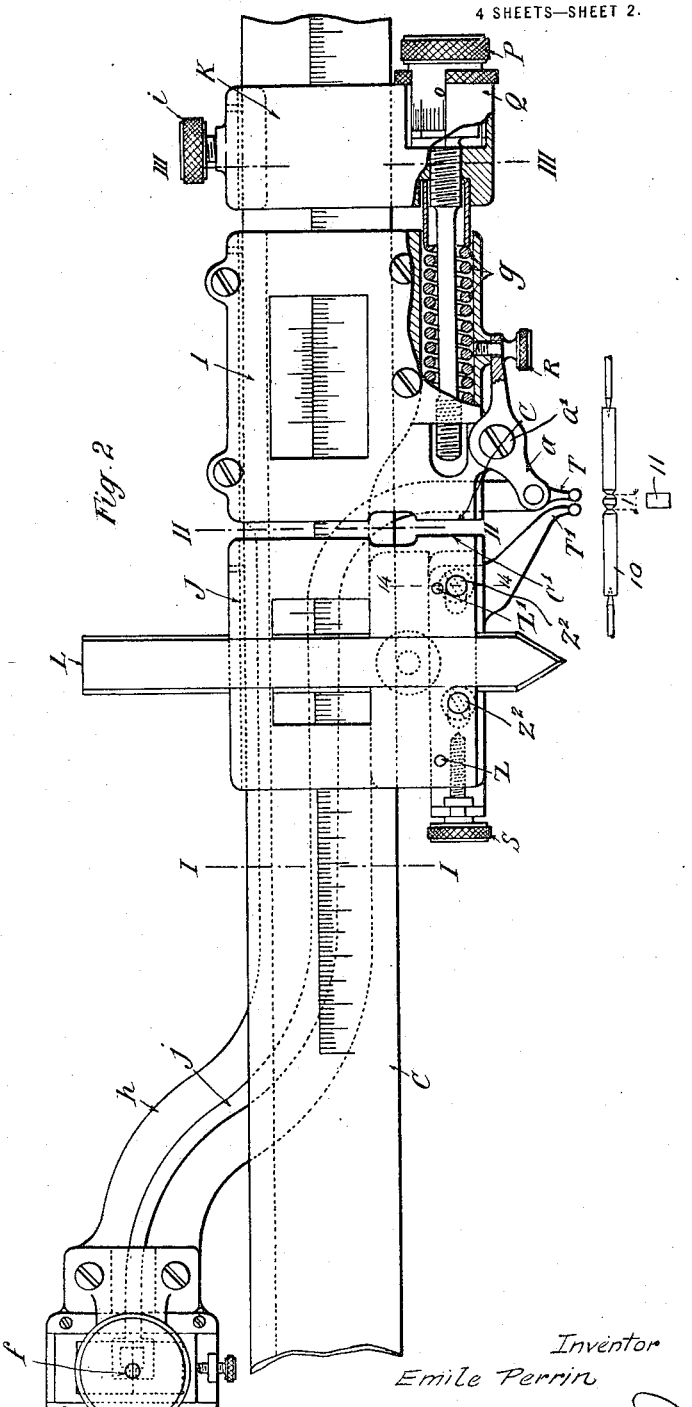
E. PERRIN.
APPARATUS FOR MEASURING THE PITCH OF CYLINDRICAL AND CONICAL SCREWS HAVING THREADS OF ANY SECTION.
APPLICATION FILED APR. 2, 1917.
1,285,356.
Patented Nov. 19, 1918.
4 SHEETS—SHEET 2.
Inventor
Emile Perrin
Attorney E. PERRIN.
APPARATUS FOR MEASURING THE PITCH OF CYLINDRICAL AND CONICAL SCREWS HAVING THREADS OF ANY SECTION.
APPLICATION FILED APR. 2, 1917.
1,285,356.
Patented Nov. 19, 1918.
4 SHEETS—SHEET 3.
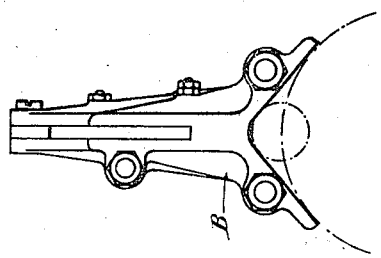
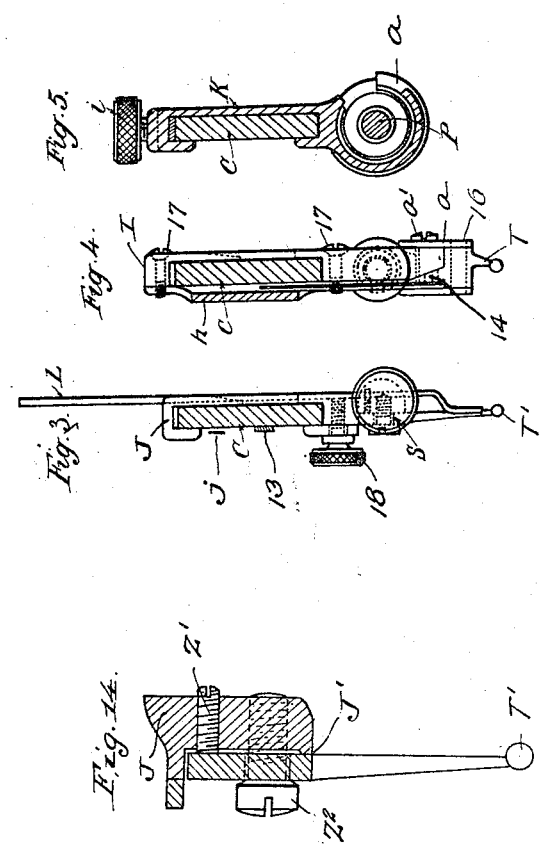
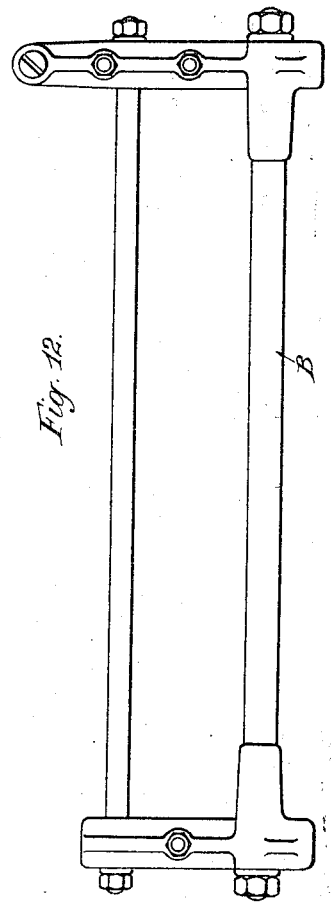
Inventor
Emile Perrin

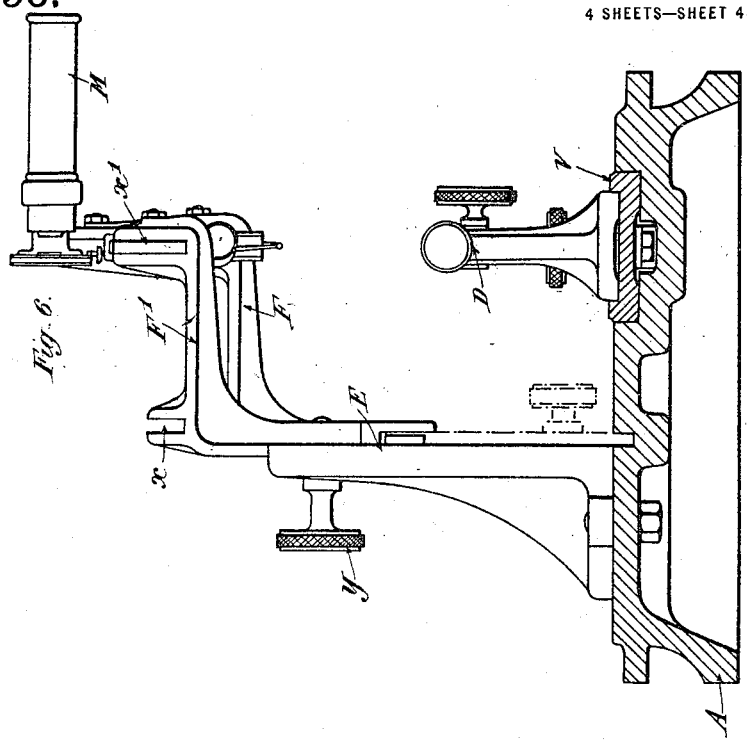
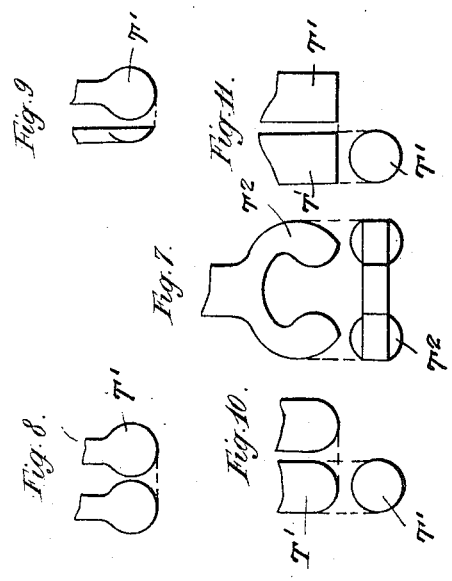

UNITED STATES PATENT OFFICE.

EMILE PERRIN, OF VANVES, FRANCE.

APPARATUS FOR MEASURING THE PITCH OF CYLINDRICAL AND CONICAL SCREWS HAVING THREADS OF ANY SECTION.

1,285,356.  Specification of Letters Patent.  Patented Nov. 19, 1918.

Application filed April 2, 1917. Serial No. 159,383.

*To all whom it may concern:*

Be it known that I, EMILE PERRIN, citizen of the Republic of France, residing at 104 Rue Sadi Carnot, Vanves, Seine, in the Republic of France, have invented new and useful Improvements in Apparatus for Measuring the Pitch of Cylindrical and Conical Screws Having Threads of Any Section, of which the following is a specification.

The object of the present invention is an apparatus designed to measure with great precision the pitch of cylindrical and conical screws having threads of any section. This apparatus comprises in the first place, in the design most generally used, a base upon which slide two heads or stocks, and the screw to be measured is placed between the points of these stocks; this frame also carries two sliding uprights in which slide two supports which can be clamped at any desired height, said supports being designed to receive a rule which is provided with measuring devices.

These measuring devices comprise essentially a sliding frame which can be made solid with the rule and carrying a fixed contact point, and a second sliding frame which can be slightly displaced upon the rule by turning a screw provided with a graduated drum, the screw being mounted in a sliding carriage which can be fixed upon the rule; the second sliding frame is provided with a movable contact which can be adjusted by means of a lever arm and carries an arm whose forked extremity presents its slit in the field of vision of a sighting telescope.

The apparatus is adjusted by clamping the sliding frame which carries the fixed contact point, in its standard position, then by clamping the sliding carriage, and by turning the screw mounted upon this carriage so as to bring the opposite faces of the two sliding frames to the required distance apart, such that a gage plate whose known thickness has approximately the same value as the pitch of the screw to be measured will fit between the said faces with a small amount of sliding friction. The position of the fixed and movable contact points is adjusted by means of suitable devices, and the slot of the arm which is solid with the movable contact point is brought into the center of the telescope field, after which a sliding piece carrying a check mark is displaced so as to bring this mark in line with the slot of the arm.

The apparatus is then ready for use. The measurement is made as follows. Place the contact pieces upon the screw to be measured. If the above-mentioned slot is now observed to be in its original position, the measurement found is the same as the thickness of the gage plate. If the slot is seen to be displaced, the measuring screw carried on the sliding carriage is turned so as to bring said slot into its original position, and in this case the drum of the screw shows the difference between the measurement as found and the thickness of the gage plate.

When the screw to be measured cannot be mounted between the stocks of the preceding base or when this screw is not easily removed, there is employed a base which is mounted so as to straddle the screw, and the measuring devices remain the same as above indicated.

In the accompanying drawings is represented an example of a method of constructing the apparatus according to the present invention.

Figure 1 is a front elevation of the entire apparatus.

Fig. 2 is a detail front view on a larger scale of the rule and the measuring devices.

Figs. 3, 4 and 5 show sections made respectively according to the lines I—I, II—II, III—III of Fig. 2.

Fig. 6 is a side elevation of the apparatus.

Fig. 7 shows another design for the contact points which bear upon the threads of the screws to be measured.

Figs. 8, 9, 10 and 11 show different forms of contacts. Figs. 12 and 13 show respectively a front and a side elevation of another design for the base of the apparatus. Fig. 14 is a detail cross sectional view taken approximately along the line 14—14 in Fig. 2.

Referring to Figs. 1 to 6, it will be observed that the apparatus comprises essentially a base A upon which can slide two stocks D and $D^1$ which support the screw to be measured and which slide upon the strip V. Upon this base are also mounted two uprights E and $E^1$, one of these being fixed while the other can be displaced along the base; these uprights are provided with grooves in which slide the two supports F and $F^1$ carrying each two grooves $x^1$ and $x$ adapted to receive the rule C either in the operative or inoperative position, the rule being graduated or not and carrying the measuring devices. In order to effect the simultaneous displacement of the two supports F and $F^1$ in the vertical sense so as to allow of the measurement of a screw of any diameter, there are employed the two wedge-shaped pieces G and $G^1$ having similar profiles and carried by a common base plate $G^2$ sliding upon the base A, the rollers H and $H^1$ being disposed so as to bear upon these pieces. The supports are clamped by means of the screws $y$.

The measuring devices comprise:

1. A sliding frame I upon which is pivoted at $a^1$ a yoke member $a$ carrying a pivot 16 which supports a pivoted contact point T whose vertical position is adjusted by means of the screw R. On an upright extension 14 (Fig. 4) of the member T, is fixed a thin, elongated arm $j$ which is bent as shown in a vertical plane and the horizontal part of which may rest upon a stop 13 (Figs. 2 and 3) secured on the rule C. The forked outer end of this arm $j$ has a slot $f$ which moves in the field of a sighting telescope M, the latter being held by the arm $h$ which is secured upon the frame I by the screws 17 (Figs. 2 and 4). This frame can be slightly displaced upon the rule C by turning the differential screw P which is screwed in the sliding frame I and in a normally fixed carriage K. The screw P has a graduated cylindrical part which rotates inside a slotted reference slide Q. The slide Q is frictionally held in a recess of carriage K and may be turned to cover the graduation of the screw P and prevent injury to the same. The carriage K can be clamped upon the rule C by means of the screw $i$, while the spring $g$ serves to take up any play which may exist.

2. A sliding frame J which can be clamped upon the rule C by means of a screw 18 and carries an upright contact piece L for verification of the angle of the threads, said piece or gage L being frictionally and removably mounted and having its end shaped according to the particular profile of the thread to be inspected. The sliding frame carries also a fixed contact point $T^1$ which can be adjusted in the longitudinal sense by means of the screw S and in the transverse direction of the machine $i.$ $e.$ normally to the plane of the drawing (Figs. 1 and 2) by means of the set screws Z and $Z^1$ said screws are screwed in the carriage J (Fig. 14) and bear at their ends against the part $T^1$ which has a bearing against the lower edge $J^1$ of carriage J so that by screwing up the screws Z and $Z^1$, the part $T^1$ may be slightly tilted about the edge $J^1$, whereby the testing point $T^1$ is displaced in a transverse direction and brought to the exact position desired. The screws $Z^2$ serve to tightly hold the point $T^1$ in any adjusted position. Since this apparatus is designed for very precise measurements, the contact points which are used to determine the value of the pitch are required to fulfil certain conditions of form and of position relative to each other and also to the generatrix of the screws under measurement, so that errors of actual manufacture shall have no effect upon the desired result. For instance each contact point can have two branches, $T^2$ as represented in Fig. 7, in order to bear upon the screw threads, both branches having for instance spherical ends as shown. The contact points can have a spherical or cylindrical form as shown in Figs. 8, 9, 10 and 11. In Fig. 8, both points have a spherical form. According to Fig. 9, they have a flat hemispherical form. In Fig. 10, they are of a cylindrical form and have rounded ends and according to Fig. 11, they are of a cylindrical form with flat ends.

To make a measurement, the first step is to adjust the apparatus. With contact points of spherical form the adjustment is carried out by the use of a grooved standard piece and a gage plate whose thickness is the same as the pitch of the grooves in the standard piece. The rule C is placed in the grooves $x$ for the inoperative position; the sliding frame J is clamped in its normal position, and the gage plate is inserted between the faces $c$ and $c^1$ of the frames I and J. The carriage K is clamped upon the rule and the measuring screw P is turned so that the gage plate works with a slight friction between the faces $c$ and $c^1$, the zero point of the measuring screw drum of screw P lying in the middle of the opening of the collar and the check line of the slide Q being placed opposite the check line on the slide Q. The rule C, together with the connected parts is then transferred into the slots $x^1$ and the contact points T and $T^1$ are placed in the grooves of the standard piece, 10, which is held between the centers in D, $D^1$, the rule C and connected parts being then held in equilibrium by means of the points T, $T^1$ upon the standard piece 10. The movable point T is then adjusted vertically by the screw R acting upon the lever $a$. The contact point $T^1$ is adjusted in the longitudinal sense by the screw S and in the transversal direction by the screws Z and $Z^1$. Adjustment in the longitudinal sense should be carried out in such manner that the slot $f$ of the fork upon the arm $j$ solid with the movable contact T is situated at the center of the field of the sighting telescope M. When this is the case, the fixed contact is clamped by means of its screws $Z^2$, and the adjustment is terminated by bringing the check line of a sliding piece N into the slot $f$ by means of the screw $o$ which displaces said sliding piece. With contact pieces which allow of adjusting by superposition, the adjustment is carried out in exactly the same way as the preceding, except that when the contact points are in perfect superposition, the faces $c$ and $c^1$ should be in contact.

The apparatus being adjusted in this way, each time that the faces $c$ and $c^1$ are separated by a given distance, if the slot lies exactly in its original check position, the distance between axes of the contact points T and $T^1$ will always be the same as the distance between the faces $c$ and $c^1$.

The contact points T and $T^1$ are placed upon the screw under measurement by lowering the two supports F and $F^1$ in the uprights E and $E^1$ by means of the wedge shaped pieces G and $G^1$ in such manner that the entire device mounted upon the rule will be supported in balanced position upon the contact points T and $T^1$; if at this time the slot $f$ is found to be in its original position, the measurement obtained is the same as the thickness of the gage plate. If this slot is seen to be above or below the check line, the screw P is turned so as to bring the slot to correspond with the check line, and the drum of the screw will show the difference between the value of the gage plate and the measurement found. It is to be observed that the gage plate is not required to have exactly the nominal value of the screw thread to be measured, and it suffices that the thickness of the plate has a value lying near the value of the screw thread, providing such thickness is exactly determined.

When the screw to be measured cannot be mounted between the two stocks of the above mentioned base, or when this screw is not easily separable, there is employed a base B as shown in Figs. 12 and 13 which is mounted so as to straddle the screw, and the measuring devices remain the same as already described.

It is understood that the above described apparatus is an illustrative example, and without departing from the principles of the invention, it is possible to modify the several parts in their forms, relative dimensions and constructive details.

Having now described my invention, what I claim as new and desire to secure by Letters Patent is:

1. An apparatus for measuring screw threads comprising in combination: a fixed contact point; a contact point movable about an axis; an indicating arm connected with said movable contact point; means for placing said indicating arm in standard position; means for displacing the fixed contact point with reference to the movable contact point; means for adjusting the distance between the fixed and movable contact points; means for clamping the fixed contact point; means for longitudinal displacement of the movable contact point with reference to the fixed contact point; and means for measuring the displacement given to said movable contact point; substantially as described and for the purpose set forth.

2. An apparatus for measuring screw threads comprising in combination: a supporting rule; a sliding frame which is fixed upon said rule; a fixed contact point connected with this sliding frame; a sliding frame which is movable upon said supporting rule; a movable contact point pivoted upon said sliding frame; an indicating arm connected with this movable contact point; a checking point provided at the end of said arm; means for determining the position of said checking point; means for displacing the movable sliding frame with reference to the fixed sliding frame; a gage plate of known thickness for use with the fixed and movable sliding frames; means for displacing the fixed contact point; means for adjusting the fixed contact point in position; means for adjusting the movable contact point in position; a standard test gage of known dimensions for use with the fixed and movable contact points; clamping screws for the fixed contact point and means for measuring the displacement of the movable frame; substantially as described and for the purpose set forth.

3. An apparatus for measuring screw threads comprising in combination: a rule; supports for said rule; means for adjusting the position of said supports; a sliding frame fixed upon said rule; a piece connected with this fixed sliding frame; screws for adjusting said piece in position; a fixed contact piece carried by said piece; a sliding frame movable upon said rule; a lever pivoted upon said movable sliding frame; an adjustment screw upon said lever; a pivot carried by said lever; a movable contact articulated upon said pivot; a movable indicating arm connected with said movable contact point; a forked piece mounted at the end of said indicating arm; a supporting arm solid with the movable sliding frame and following the direction of said movable arm; a sighting telescope mounted upon said supporting arm; a sliding piece carrying a checking point provided upon said telescope; a carriage sliding upon said supporting rule; means for clamping said carriage upon the rule; a gage plate of known thickness for use with the sliding frames; means for displacing the movable sliding frame with reference to the fixed carriage; a standard testing gage of known dimensions for use with the fixed and movable contact points; and means for measuring the displacement of the movable sliding frame with reference to the fixed carriage; substantially as described and for the purpose set forth.

4. An apparatus for measuring screw threads comprising in combination: a base; stocks for supporting the screw to be measured and movable upon said base; sliding uprights mounted upon said base; supports which slide in said sliding uprights; means for displacing said supports in their slides; clamping screws provided upon said supports; a rule mounted upon said supports; a sliding frame fixed upon said rule; a piece connected with this fixed sliding frame; screws for adjusting the position of said piece with reference to said fixed sliding frame; a fixed contact piece mounted upon said piece, a sliding frame movable upon said rule; a lever pivoted upon said movable sliding frame; a screw for adjusting said lever in position; a pivot mounted upon said lever, a movable contact articulated upon said pivot; an indicating arm connected with said movable frame; a forked piece mounted at the end of said indicating arm; a supporting arm solidary with the movable sliding frame and following the direction of said movable arm; a sighting telescope mounted upon said supporting arm; a sliding piece carrying a checking point provided upon said telescope; a carriage sliding upon the supporting rule; a screw for clamping said carriage upon said rule; a standard gage plate of known thickness for use with the sliding frames; a threaded rod mounted in the fixed carriage and screwing into the movable sliding frame; means for taking up the play of said threaded rod; a standard testing gage of known dimensions for use with the fixed and movable contact points; and a graduation provided upon said screw connecting the movable sliding frame with the fixed carriage, substantially as described and for the purpose set forth.

In testimony whereof I have signed my name to this specification in the presence of two subscribing witnesses.

EMILE PERRIN.

Witnesses:
Louis Moses,
Chas. P. Pressly.

Copies of this patent may be obtained for five cents each, by addressing the "Commissioner of Patents, Washington, D. C."